United States Patent
Lee et al.

(10) Patent No.: US 9,891,673 B2
(45) Date of Patent: Feb. 13, 2018

(54) BUFFER MEMBER, BUFFER FRAME AND ELECTRICAL DEVICE

(71) Applicant: Wistron Corp., New Taipei (TW)

(72) Inventors: Yun-Ping Lee, New Taipei (TW); Hsiang-Ming Lu, New Taipei (TW); Kuan-You Chen, New Taipei (TW); Wenlong Chen, New Taipei (TW); Min-Hung Chen, New Taipei (TW)

(73) Assignee: WISTRON CORP., New Taipei (TW)

( * ) Notice: Subject to any disclaimer, the term of this patent is extended or adjusted under 35 U.S.C. 154(b) by 264 days.

(21) Appl. No.: 14/170,181

(22) Filed: Jan. 31, 2014

(65) Prior Publication Data
US 2015/0117696 A1   Apr. 30, 2015

(30) Foreign Application Priority Data

Oct. 25, 2013   (TW) .............................. 102138641 A

(51) Int. Cl.
*H04R 1/02* (2006.01)
*G06F 1/16* (2006.01)
*A47B 81/00* (2006.01)
*F16F 15/08* (2006.01)

(52) U.S. Cl.
CPC ............ *G06F 1/1688* (2013.01); *A47B 81/00* (2013.01); *F16F 15/085* (2013.01); *G06F 1/1658* (2013.01); *H04R 1/028* (2013.01)

(58) Field of Classification Search
CPC ...... A47B 81/00; G06F 1/1688; G06F 1/1658; H04R 1/028
USPC ......................................................... 381/392
See application file for complete search history.

(56) References Cited

U.S. PATENT DOCUMENTS

| | | | | |
|---|---|---|---|---|
| 6,122,165 A | * | 9/2000 | Schmitt | G06F 1/184 361/679.31 |
| 6,477,042 B1 | * | 11/2002 | Allgeyer | G11B 33/08 360/99.18 |
| 7,369,402 B2 | * | 5/2008 | Huang | G11B 33/08 312/223.1 |
| 7,995,337 B2 | | 8/2011 | Kuo | |
| 2005/0135057 A1 | * | 6/2005 | Mihara | G06F 1/1616 361/679.33 |
| 2007/0025014 A1 | * | 2/2007 | Kim | G06F 1/187 360/97.19 |

* cited by examiner

*Primary Examiner* — Sean H Nguyen
(74) *Attorney, Agent, or Firm* — Maschoff Brennan

(57) ABSTRACT

A buffer member includes a first buffer portion, a pin, a bending portion and a second buffer portion. The pin is located on the first buffer portion. The bending portion is connected with the first buffer portion. The second buffer portion is connected with the bending portion, and the first buffer portion is connected with the second buffer portion via the bending portion. A reinforcing member is located inside the pin for raising the rigidity of the pin. The pin is used for fixing a vibration source. The first buffer portion and the second buffer portion reduce the transmission of the vibration energy from the vibration source.

11 Claims, 8 Drawing Sheets

BUFFER MEMBER, BUFFER FRAME AND ELECTRICAL DEVICE

CROSS-REFERENCE TO RELATED APPLICATIONS

This non-provisional application claims priority under 35 U.S.C. §119(a) on Patent Application No(s). 102138641 filed in Taiwan, R.O.C. on Oct. 25, 2013, the entire contents of which are hereby incorporated by reference.

TECHNICAL FIELD

The disclosure relates to a buffer member, a buffer frame and an electrical device, more particularly to an electrical device and its buffer member without screw.

BACKGROUND

A hard disk drive is generally mounted to a main body of a laptop by a screw. However, it takes extra expenditure in labor cost and material cost because the screw is not only too small to keep, but also needs to cooperate with the corresponding tool according to the sorts of the screws.

Furthermore, the efficiency and the life span of the hard disk drive are easily affected by the external force or vibration when the hard disk drive operates. Therefore, how to prevent the hard disk drive from vibration is important. In general, the buffer member, such as rubber, is used as a frame for fixing the hard disk drive, which significantly enhances the protection of the hard disk drive against vibration. Specifically, if the rubber with lower elasticity (namely; flexible rubber) is chosen to be the frame of the hard disk drive, it may reduce the vibration but the hard disk drive may not be securely mounted, such that the hard disk drive is easily failed because of the movement. On the contrary, if the rubber with higher elasticity (namely; rigid rubber) is chosen to be the frame of the hard disk drive, it may be securely mounted but generates the vibration such that the hard disk drive is negatively affected because of the vibration.

Therefore, it is difficult to take the buffer and fixation effects into consideration at the same time. Accordingly, it is important to reduce the vibration when the hard disk drive is fixed on the laptop.

SUMMARY

An embodiment of the disclosure provides an electrical device comprising a storage device, a frame body and a buffer member. The storage device has at least an opening. The frame body comprises a lateral plate and a bottom plate. The lateral plate has an accommodation space for accommodating the storage device. The lateral plate comprises a perforation hole, an inner side surface and an outer side surface which is opposite to the inner side surface. The inner side surface faces toward the storage device and the perforation hole is formed between the inner side surface and the outer side surface. The bottom plate is connected with the lateral plate. The bottom plate has a top surface and a bottom surface which is opposite to the top surface, and the top surface faces toward the storage device. The buffer member comprises a first buffer portion, a pin, a bending portion and a second buffer portion. The hardness of the first buffer portion is lower than that of the frame body, and the first buffer portion is attached to the outer side surface of the lateral plate. The pin is located on the first buffer portion, and the pin passes through the perforation hole and inserts into the opening of the storage device. The bending portion is connected with the first buffer portion. The second buffer portion is connected with the bending portion. The first buffer portion is connected with the second buffer portion via the bending portion, and the second buffer portion is attached to the bottom surface of the bottom plate.

An embodiment of the disclosure provides a buffer frame comprising a frame body and a buffer member. The frame body comprises a lateral plate and a bottom plate. The lateral plate has an accommodation space. The lateral plate has a perforation hole, an inner side surface and an outer side surface which is opposite to the inner side surface. The inner side surface faces toward the accommodation space and the perforation hole is formed between the inner side surface and the outer side surface. The bottom plate is connected with the lateral plate. The bottom plate has a top surface and a bottom surface which is opposite to the top surface, and the top surface faces toward the accommodation space. The buffer member comprises a first buffer portion, a pin, a bending portion and a second buffer portion. The hardness of the first buffer portion is lower than that of the frame body. The pin is located on the first buffer portion. The bending portion is connected with the first buffer portion. The second buffer portion is connected with the bending portion. The first buffer portion is connected with the second buffer portion via the bending portion. The second buffer portion is attached to the bottom surface of the bottom plate. The first buffer portion is attached to the outer side surface of the lateral plate, and the pin passes through the perforation hole.

An embodiment of the disclosure provides a buffer member comprising a first buffer portion, a pin, a bending portion, a second buffer portion and a reinforcing member. The pin is located on the first buffer portion. The bending portion is connected with the first buffer portion. The second buffer portion is connected with the bending portion. The first buffer portion is connected with the second buffer portion via the bending portion. The hardness of the reinforcing member is higher than that of the first buffer portion, the pin, the bending portion and the second buffer portion. The reinforcing member is located inside the pin.

An embodiment of the disclosure provides an electrical device comprising a speaker and a buffer member. The speaker comprises a top surface and a bottom surface which is opposite to the top surface, and the top surface comprises at least an opening. The buffer member comprises a first buffer portion, a pin, a bending portion and a second buffer portion. The pin is located on the first buffer portion, and the pin passes through the opening of the speaker. The bending portion is connected with the first buffer portion. The second buffer portion is connected with the bending portion. The first buffer portion is connected with the second buffer portion via the bending portion, and the second buffer portion is attached to the bottom surface of the bottom plate.

According to the embodiments of buffer member, buffer frame and electrical device, the first buffer portion and the second buffer portion provide the buffer effect, which prevents the vibration source from being failed by the external force, or prevents other electrical components from being negatively affected by the vibration generated from the vibration source. In addition, the buffer member not only reduces the vibration but also fixes to the device at the same time, because the reinforcing member is located inside the pin. Moreover, the components of the electrical device are affixed to each other without any screw because of the fixation by the buffer member. Therefore, it saves the labor cost and material cost according to the embodiment of the disclosure.

BRIEF DESCRIPTION OF THE DRAWING

The disclosure will become more fully understood from the detailed description given herein below and the drawing are for illustration only, and thus does not limit the present disclosure, wherein.

DETAILED DESCRIPTION

Figure 1A:
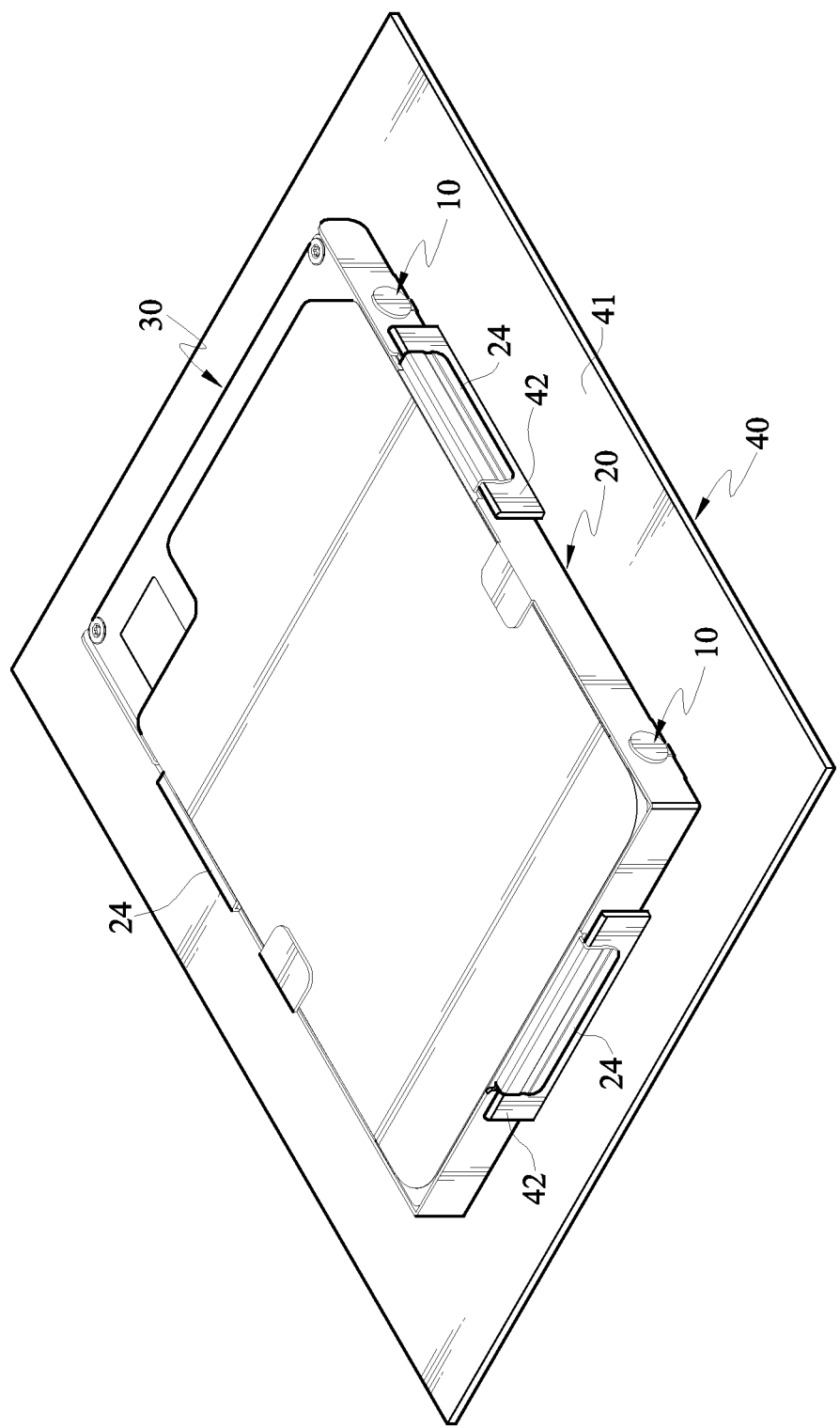
FIG. 1A is a perspective view of an electrical device according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1B:
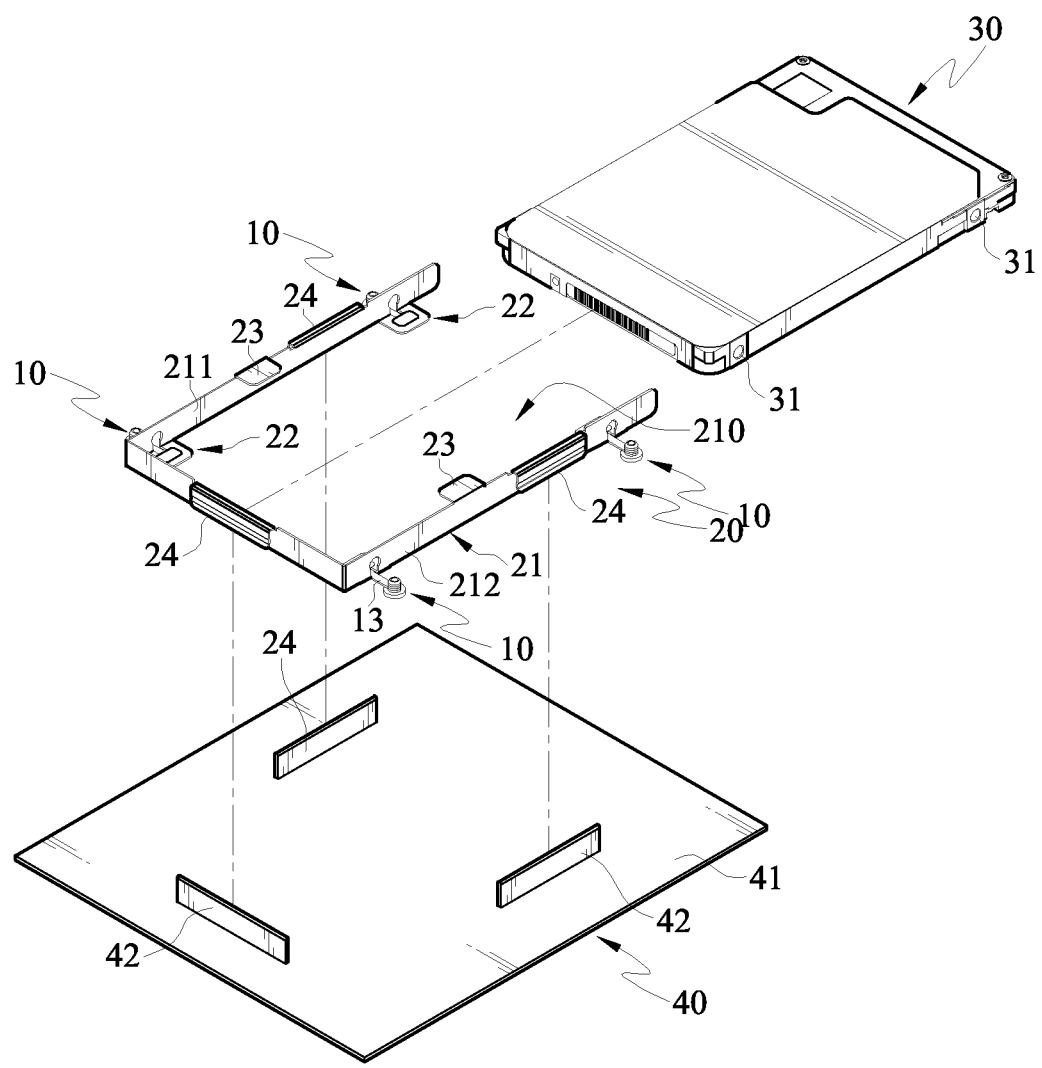
FIG. 1B is an exploded view of the electrical device according to an embodiment of the disclosure.

Please refer to FIG. 1A and FIG. 1B, FIG. 1A is a perspective view of an electrical device according to an embodiment of the disclosure. FIG. 1B is an exploded view of the electrical device according to an embodiment of the disclosure. In this embodiment, an electrical device 1 is a laptop, but the disclosure is not limited thereto. For example, the electrical device 1 is a server or other operation device in some other embodiments of the disclosure. In this embodiment, the electrical device 1 comprises a storage device 30, a frame body 20, a buffer member 10 and a main body 40.

In this embodiment, the storage device 30 is a hard disk drive, but the disclosure is not limited thereto. Furthermore, the storage device 30 can be regarded as a vibration source. The storage device 30 has two openings 31 located on two opposite sides of the storage device 30, respectively, but the number of the openings 31 in the disclosure is not limited thereto. The number of the openings 31 of the storage device 30 may be adjusted by one of the ordinary skill in the art according to actual requirement.

Figure 2:
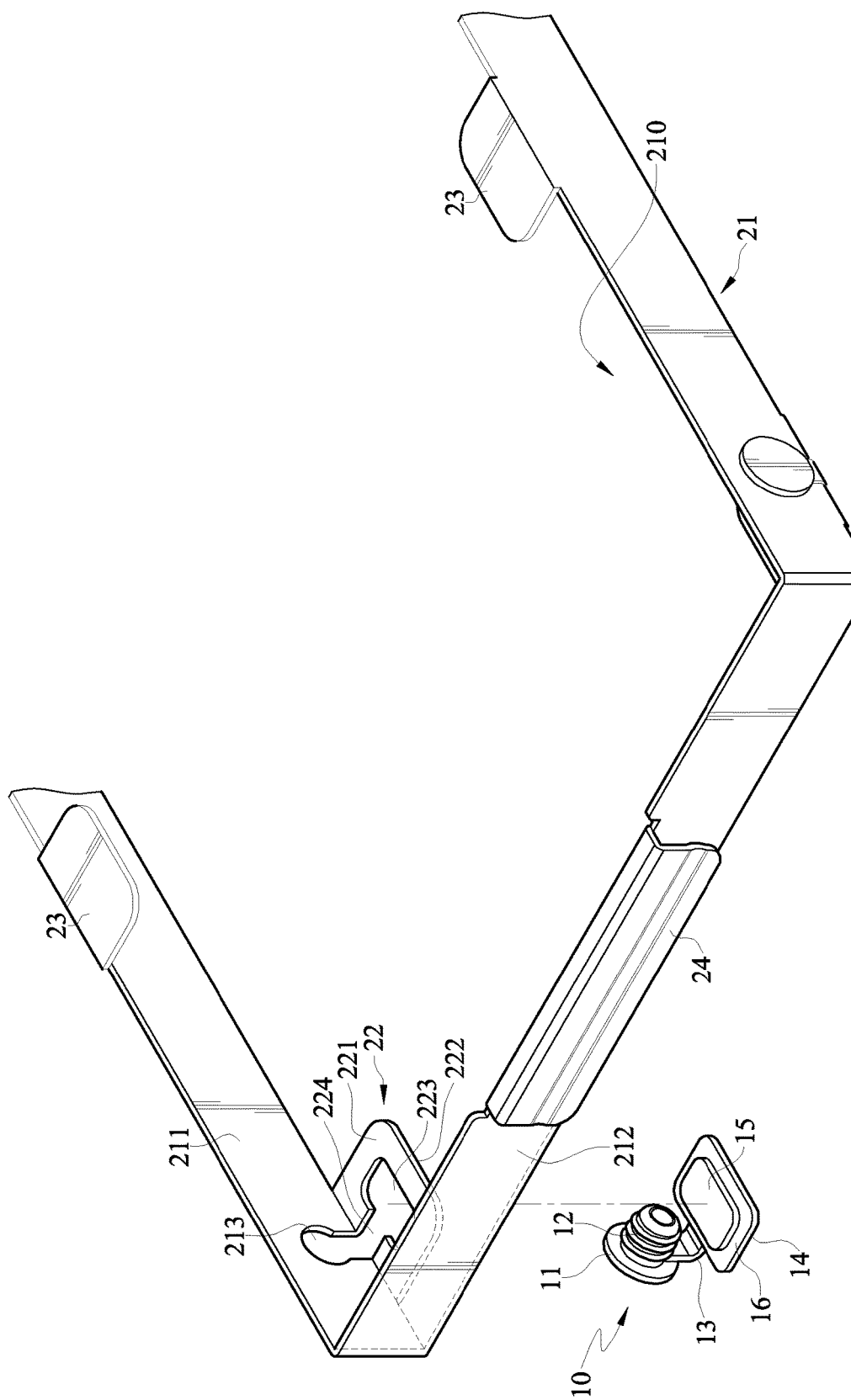
FIG. 2 is an exploded view of a buffer frame according to an embodiment of the disclosure.
Figure 3A:
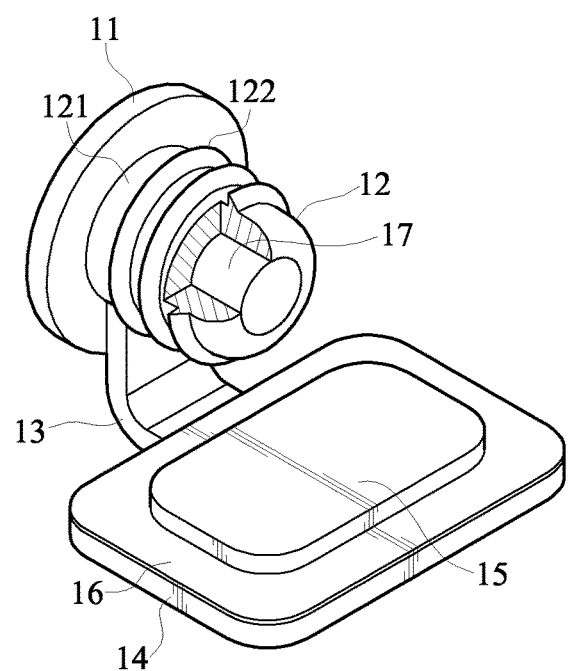
FIG. 3A is a perspective view of a buffer member according to an embodiment of the disclosure.
Figure 3B:
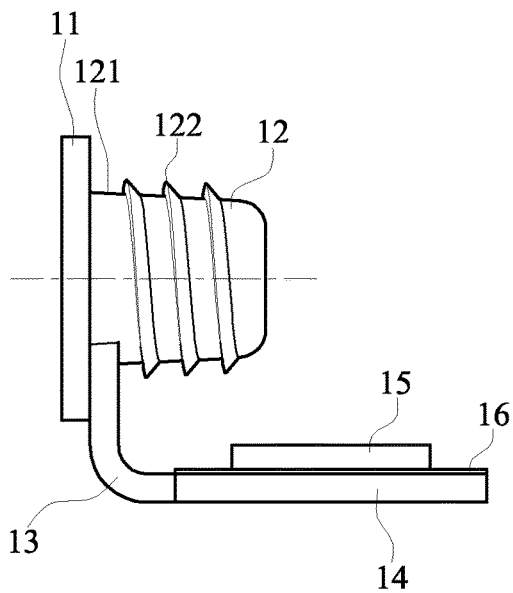
FIG. 3B is a side view of the buffer member according to an embodiment of the disclosure.

In addition, the frame body 20 and the buffer member 10 together form a buffer frame. Specifically, please refer to FIG. 2, FIG. 3A and FIG. 3B, FIG. 2 is an exploded view of a buffer frame according to an embodiment of the disclosure. FIG. 3A is a perspective view of a buffer member according to an embodiment of the disclosure. FIG. 3B is a side view of the buffer member according to an embodiment of the disclosure. In this embodiment, the frame body 20 has a lateral plate 21, four bottom plates 22 and two top plates 23. The lateral plate 21 is substantially a U-shaped configuration. An accommodation space 210 is formed within the area where the lateral plate 21 surrounds. The accommodation space 210 is used for accommodating the storage device 30. Moreover, the lateral plate 21 has a perforation hole 213, an inner side surface 211 and an outer side surface 212 which is opposite to the inner side surface 211. The inner side surface 211 faces toward the accommodation space 210 and the perforation hole 213 is formed between the inner side surface 211 and the outer side surface 212.

Each of the four bottom plates 22 connects with the lateral plate 21, and each of the four bottom plates 22 is substantially perpendicular to the lateral plate 21. The bottom plate 22 has a top surface 221 and a bottom surface 222 which is opposite to the top surface 221, and the top surface 221 faces toward the accommodation space 210. Each of the four bottom plates 22 further includes an engaging hole 223 facing toward the top surface 221 from the bottom surface 222 of the bottom plate 22. It is noted that the characteristic of the engaging hole 223 facing the bottom plate 22 in the disclosure is not limited thereto. In some other embodiments of the disclosure, the engaging hole 223 is recessed toward the top surface 221 from the bottom surface 222 instead of being a through hole in the bottom plate 22. Furthermore, the frame body 20 further includes four connecting holes 224. Each of the four connecting holes 224 is a through hole formed between the bottom plate 22 and the lateral plate 21, and the two opposite sides of the connecting holes 224 are connected with the perforation hole 213 and the engaging hole 223, respectively. In this embodiment, the number of the bottom plate 22 is four. It is also noted that the number of the bottom plate 22 in the disclosure is not limited thereto, and the number of the bottom plate 22 may be adjusted by one of the ordinary skill in the art according to actual requirement.

Each of the top plates 23 is connected with the lateral plate 21 as well as substantially perpendicular to the lateral plate 21. Moreover, the top plate 23 and the bottom plate 22 are located on the two opposite sides of the accommodation space 210, respectively. In other words, the accommodation space 210 is formed between the top plate 23 and the bottom plate 22. The storage device 30 is sandwiched between (namely, enclosed by) the top plate 23 and the bottom plate 22 when the storage device 30 is located inside the accommodation space 210. It is noted that the number of the top plates 23 in this embodiment is two, but the number of the top plate 23 in the disclosure is not limited thereto. The number of the top plate 23 may be adjusted according to actual requirement. In addition, the number of the top plates 23 in this embodiment is substantially different from that of the bottom plate 22, and the top plate 23 and the bottom plate 22 are in a staggered arrangement (namely, the top plate 23 and the bottom plate 22 do not face to each other) rather than in a corresponding arrangement, but this feature in this embodiment is not limited thereto. For example, the top plate 23 is oppositely located to the bottom plate 22 (face to face with each other) if the number of the top plate 23 is equal to that of the bottom plate 22.

Furthermore, in this embodiment, the frame body 20 further includes a first holding portion 24 located on the outer side surface 212 of the lateral plate 21. In this embodiment, the first holding portion 24 is a spring clip such that the frame body 20 is securely located on the main body 40 by the spring clip. The configuration of how the frame body 20 is located on the main body 40 by the first holding portion 24 is going to be illustrated as follows. In addition, the material of the frame body 20 in this embodiment is metal, but the disclosure is not limited thereto. In some other embodiments of the disclosure, the nonmetallic material with higher rigidity is used as frame body 20.

The buffer member 10 includes a first buffer portion 11, a pin 12, a bending portion 13, a second buffer portion 14 and a reinforcing member 17. The pin 12 is located on one side of the first buffer portion 11. The width of the bending portion 13 is smaller than that of the first buffer portion 11 and the second buffer portion 14, and the two opposite sides of the bending portion 13 are connected with the first buffer portion 11 and the second buffer portion 14, respectively, such that the first buffer portion 11 is connected with the second buffer portion 14 via the bending portion 13. The first buffer portion 11 may be shifted relative to the second buffer portion 14 because the bending portion 13 is bent.

Furthermore, the first buffer portion 11, the pin 12, the bending portion 13, and the second buffer portion 14 are integrally formed into one piece and the hardness of it is smaller than that of the frame body 20. Specifically, the first buffer portion 11, the pin 12, the bending portion 13, and the second buffer portion 14 are made from the same elastic material such as rubber or silicone. In this embodiment, the hardness of the reinforcing member 17 is higher than that of the first buffer portion 11, the pin 12, the bending portion 13, and the second buffer portion 14, and the material of the reinforcing member 17 is metal. The reinforcing member 17 is located inside the pin 12, and the reinforcing member 17 is used for enhancing the rigidity and the strength. In this embodiment, the reinforcing member 17 is integrally formed with the pin 12, for example, by insert molding, but the configuration of the reinforcing member 17 being located inside the pin 12 by integrated form in the disclosure is not limited thereto. In addition, the pin 12 passes through the openings 31 of the storage device 30 such that the storage device 30 is securely located on the frame body 20. The configuration of how the storage device 30 is securely located on the frame body 20 is going to be illustrated in the following description.

In this embodiment, the outer diameter of the pin 12 is gradually increased along a direction facing toward the first buffer portion 11 (as shown in FIG. 3B). Namely, the pin 12 is in pyramidal shape such that the pin 12 is easily inserted into the opening 31. It is noted that the configuration of the outer diameter of the pin 12 gradually increasing toward the first buffer portion 11 in the disclosure is not limited thereto. In some other embodiments of the disclosure, the outer diameter of the pin 12 keeps constant.

In addition, in this embodiment, an outer surface 121 of the pin 12 further includes a thread 122 for enhancing the joint strength when the pin 12 is inserted into the openings 31.

In this embodiment, the buffer member 10 further includes an engaging projection 15 and an adhesive layer 16. Both of the engaging projection 15 and the adhesive layer 16 are located at the same side of the second buffer portion 14 and the adhesive layer 16 surrounds the engaging projection 15. It is noted that the configuration of the adhesive layer 16 surrounding the engaging projection 15 in the disclosure is not limited thereto. One of the ordinary skill in the art may adjust the relative position between the adhesive layer 16 and the engaging projection 15.

The second buffer portion 14 of the buffer member 10 is attached to the bottom surface 222 of the bottom plate 22 of the frame body 20, and the engaging projection 15 is engaged with the engaging hole 223 of the bottom plate 22, such that a buffer frame is formed by the combination of the buffer member 10 and the frame body 20.

The main body 40 has a bearing portion 41 and at least a second holding portion 42 located on the bearing portion 41, and the second holding portion 42 is a wall which is erected on the bearing portion 41. The number of the second holding portion 42 of the main body 40 corresponds to that of the first holding portion 24, such that the frame body 20 is securely connected with the main body 40 by the combination of the first holding portion 24 and the second holding portion 42. The method for combining the frame body 20 with the main body 40 is going to be illustrated in the following description.

Please refer to the FIG. 1B and FIG. 2, the assembling method of the electrical device 1 is going to be described in the following description. First, the storage device 30 is located inside the accommodation space 210 of the frame body 20 of the buffer frame 5 by a user, such that the storage device 30 is sandwiched (namely, enclosed by) between the bottom plate 22 and the top plate 23. Specifically, the bottom plate 22 and the top plate 23 may limit the displacement of the storage device 30 in the vertical direction. Furthermore, the openings 31 of the storage device 30 are fitted to the perforation holes 213 of the frame body 20 after the storage device 30 is located inside the accommodation space 210. At this moment, the bending portion 13 of the buffer member 10 is bent by the user, such that the pin passes through the perforation hole 213 and inserts into the opening 31 of the storage device 30, and the first buffer portion 11 of the buffer member 10 is attached to the outer side surface 212 of the frame body 20. Therefore, the storage device 30 is securely located inside the accommodation space 210 of the frame body 20 and the bending portion 13 is located inside the connecting hole 224 at the same time. Specifically, the connecting hole 224 is used for accommodating the bending portion 13 which is bent in order to prevent the bending portion 13 from protruding the outer side surface 212 of the lateral plate 21, thus, the bending portion 13 does not interfere with other components (not shown) inside the electrical device 1.

It is worth noting that the opening 31 of the storage device 30 is a threaded hole and the thread 122 is located on an outer surface 121 of the pin 12, thus, the joint strength between the pin 12 and the opening 31 is raised.

Figure 4A:
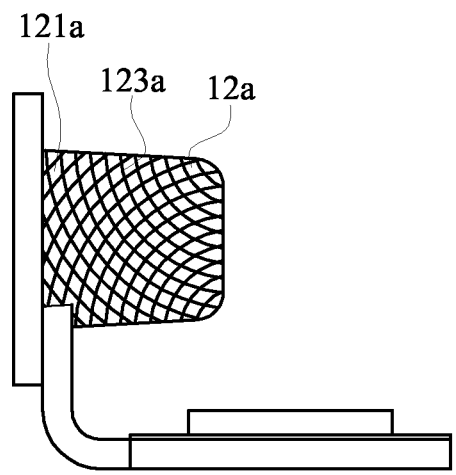
FIG. 4A is a side view of a buffer member according to another embodiment of the disclosure.
Figure 4B:
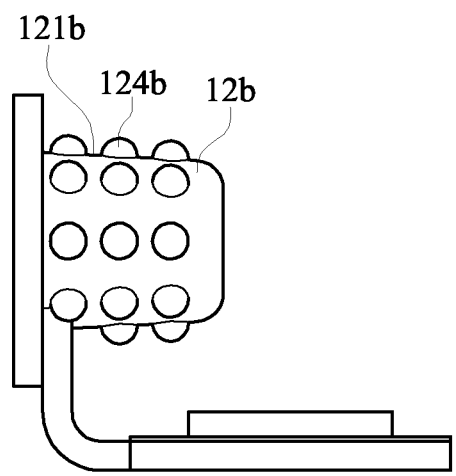
FIG. 4B is a side view of a buffer member according to another embodiment of the disclosure.

Please refer to FIG. 4A and FIG. 4B, FIG. 4A is a side view of a buffer member according to another embodiment of the disclosure. FIG. 4B is a side view of a buffer member according to another embodiment of the disclosure. In this embodiment (as shown in FIG. 4A), a texture 123a is located on an outer surface 121a of the pin 12a and the texture 123a also raises the joint strength between the pin 12a and the opening 31. Furthermore, in this embodiment (as shown in FIG. 4B), a plurality of projections 124b are located on an outer surface 121b of the pin 12b and the plurality of projections 124b also raise the joint strength between the pin 12b and the opening 31.

In some other embodiments of the disclosure, it is noted that the pin 12 is tightly fitted (interference fit) with the opening 31 for enhancing the joint strength, and there is no other protrusion structure located on the outer surface 121 of the pin 12.

After the storage device 30 is combined with the frame body 20 and the buffer member 10, the frame body 20 and the storage device 30 regarded as a whole is located on the bearing portion 41 of the main body 40, such that second holding portion 42 is sandwiched (namely, enclosed by)

between the first holding portion 24 and the lateral plate 21 of the frame body 20. Therefore, the assembly of electrical device 1 is completed according to the above procedure.

In this embodiment, it is noted that the first buffer portion 11 of the buffer member 10 reduces the vibration of the storage device 30 in the horizontal direction, and the second buffer portion 14 of the buffer member 10 reduces the vibration of the storage device 30 in the vertical direction, thus it prevents the storage device 30 from failure by the external force, or prevents other components inside the storage device 30 from being negatively affected by the vibration generated from the operation of the storage device 30. Furthermore, in this embodiment, the reinforcing member 17 is located inside the pin 12, thus, the pin 12 still keeps enough rigidity and strength even the flexible rubber is chosen to be the first buffer portion 11, the pin 12, the bending portion 13 and the second buffer portion 14. Therefore, the buffer and fixation effects of the buffer member 10 are taken into consideration at the same time according to the embodiment of the disclosure. In other words, it maintains the balance between the buffer and fixation effects.

In addition, the components of the electrical device 1 mentioned above are affixed to each other without any other screw or bolt. Therefore, it saves the labor cost and material cost according to the embodiment of the disclosure.

Figure 5:
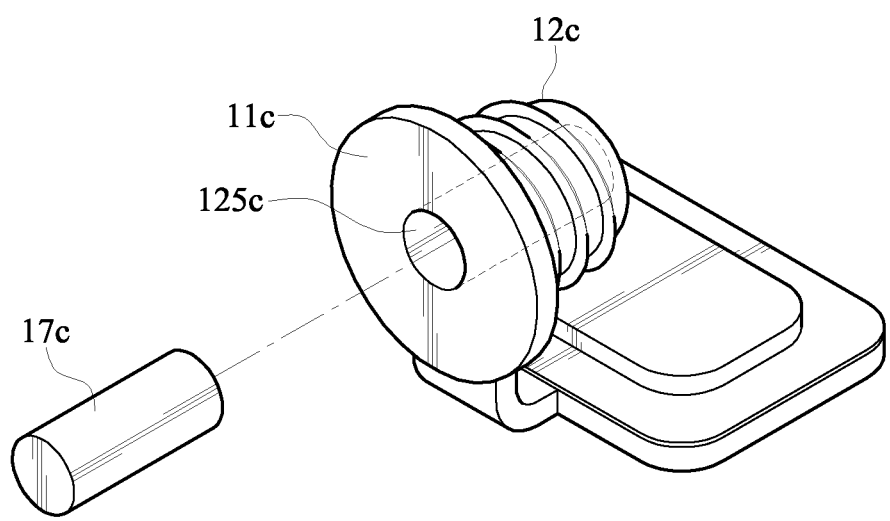
FIG. 5 is an exploded view of the buffer member according to another embodiment of the disclosure.

In this embodiment, it is noted that the reinforcing member 17 is integrally formed to be located inside the pin 12, but the configuration of the reinforcing member 17 located inside the pin 12 by integrally formed in the disclosure is not limited thereto. For example, please refer to FIG. 5, which is an exploded view of the buffer member according to another embodiment of the disclosure. In other embodiment of the disclosure, the pin 12c has a mounting hole 125c which passes through the first buffer portion 11c. The reinforcing member 17c passes through the mounting hole 125c via one side of the first buffer portion 11c such that the reinforcing member 17c is located inside the pin 12c.

Figure 6A:
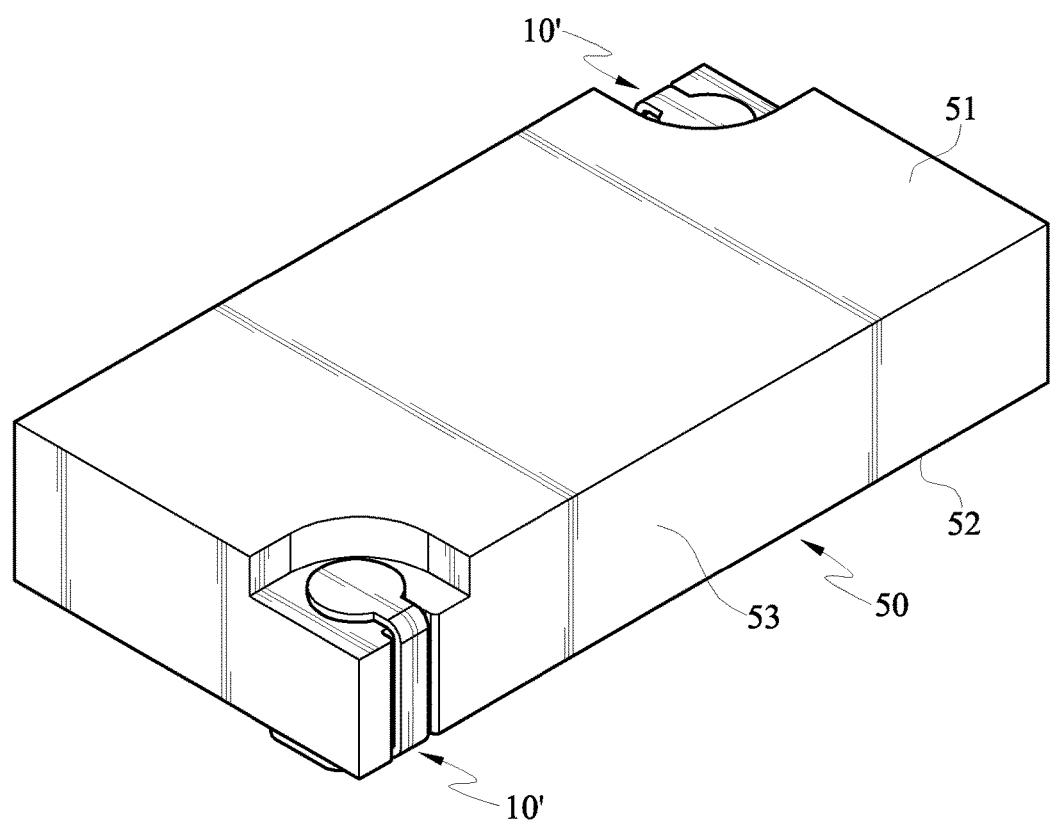
FIG. 6A is a perspective view of an electrical device according to another embodiment of the disclosure.
Figure 6B:
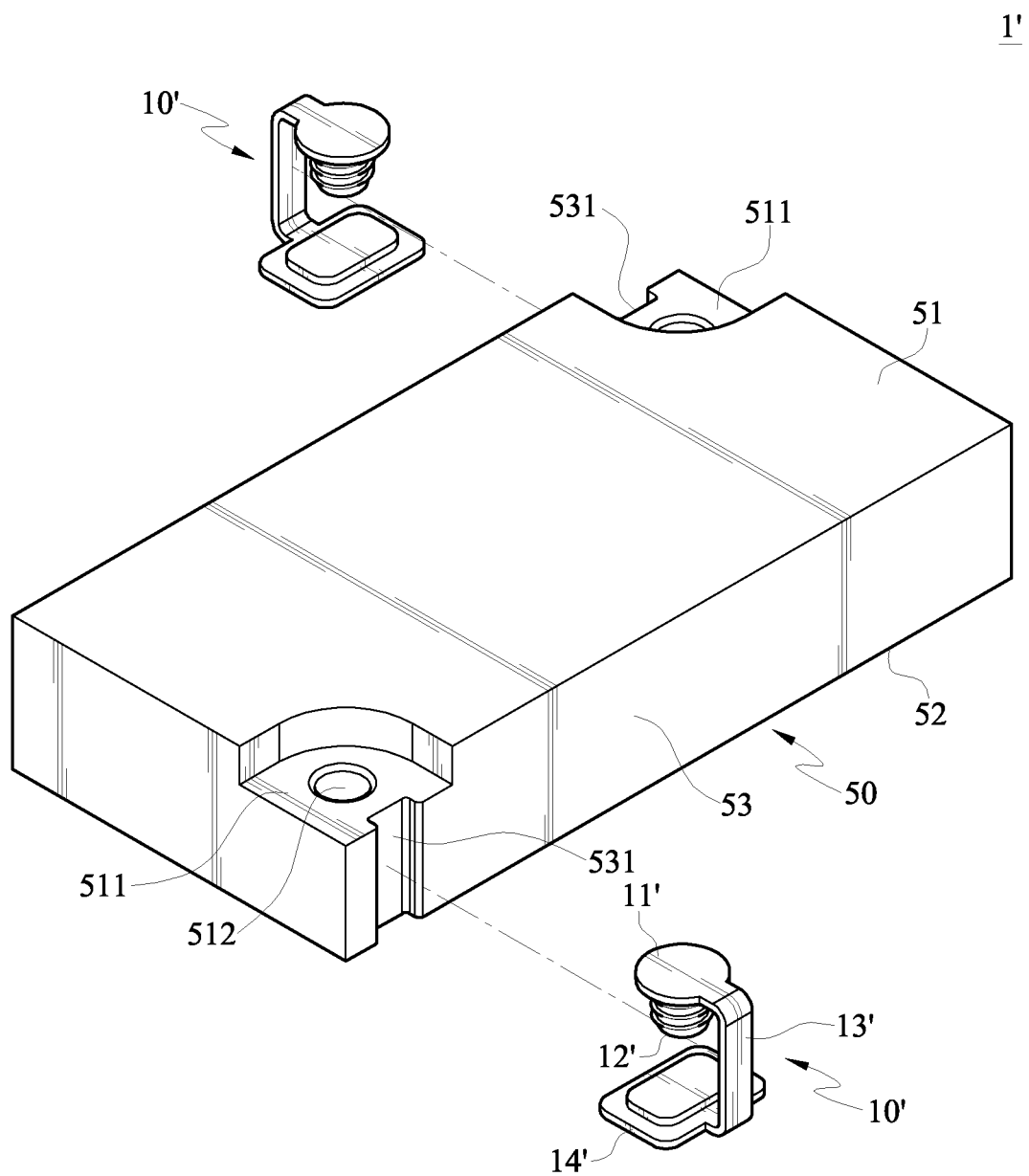
FIG. 6B is an exploded view of the electrical device according to another embodiment of the disclosure.

Furthermore, the buffer member 10 in this embodiment is applied to the storage device, but the disclosure is not limited thereto. For example, the buffer member 10 is also applied to other vibration source. Please refer to FIG. 6A and FIG. 6B, FIG. 6A is a perspective view of an electrical device according to another embodiment of the disclosure. FIG. 6B is an exploded view of the electrical device according to another embodiment of the disclosure. In this embodiment, the electrical device 1' further comprises a speaker 50 and a buffer member 10'. Specifically, the vibration source in this embodiment is the speaker 50. The speaker 50 has a top surface 51, a bottom surface 52 opposite to the top surface 51 and a lateral surface 53. The lateral surface 53 is located between the top surface 51 and the bottom surface 52. The top surface 51 of the speaker 50 has a recess 511 and at least an opening 512, and the opening 512 is located inside the recess 511. The lateral surface 53 of the speaker 50 has a groove 531 which extends toward the bottom surface 52 from the top surface 51.

Furthermore, the configuration of the buffer member 10' is substantially similar to the embodiment shown as FIG. 3A, and the similar description is not repeated herein again. The first buffer portion 11' of the buffer member 10' is attached to the recess 511 and the pin 12' is inserted into the opening 512 when the buffer member 10' is located inside the speaker 50. The bending portion 13' is located on the groove 531 of the lateral surface 53 and the second buffer portion 14' is attached to the bottom surface 52 of the speaker 50. The buffer member 10' is located on the main body (not shown) of the electrical device by any feasible measure, such that the speaker 50 is securely located on the main body of the electrical device. Specifically, the buffer member 10' in this embodiment provides both the buffer and fixation effects for the speaker 50. Furthermore, the disposing of the recess 511 of the top surface 51 of the speaker 50 and the groove 531 of the lateral surface 53 prevents the first buffer portion 11' of the buffer member 10' from protruding the top surface 51 of the speaker 50, and prevents the bending portion 13' of the buffer member 10' from protruding the lateral surface 53 of the speaker 50.

According to the embodiments of buffer member, buffer frame and electrical device, the first buffer portion and the second buffer portion provide the buffer effect, which prevents the vibration source from being failed by the external force, or prevents other electrical components from being negatively affected by the vibration generated from the vibration source. In addition, the buffer member not only reduces the vibration but also fixes to the device at the same time, because the reinforcing member is located inside the pin. Moreover, the components of the electrical device are affixed to each other without any screw because of the fixation by the buffer member. Therefore, it saves the labor cost and material cost according to the embodiment of the disclosure.

What is claimed is:
1. An electrical device, comprising:
a storage device having at least an opening;
a frame body, comprising:
a lateral plate having an accommodation space for accommodating the storage device, wherein the lateral plate has a perforation hole, an inner side surface and an outer side surface which is opposite to the inner side surface, wherein the inner side surface faces toward the storage device and the perforation hole is formed between the inner side surface and the outer side surface; and
a bottom plate connected with the lateral plate, wherein the bottom plate extends away from the inner side surface of the lateral plate, the bottom plate has a top surface and a bottom surface which is opposite to the top surface, the top surface faces toward the storage device, the bottom surface of the bottom plate is opposite to the accommodation space, and there is a non-straight angle between the top surface and the inner side surface; and
a buffer member, comprising:
a first buffer portion, wherein the hardness of the first buffer portion is lower than that of the frame body, and the first buffer portion is attached to the outer side surface of the lateral plate;
a pin located on the first buffer portion, and the pin passing through the perforation hole and inserting into the opening of the storage device;
a bending portion connected with the first buffer portion; and
a second buffer portion connected with the bending portion, wherein the first buffer portion is connected with the second buffer portion via the bending portion, and the second buffer portion is attached to the bottom surface of the bottom plate.

2. The electrical device according to claim 1, wherein the frame body further comprises a top plate which is connected with the lateral plate, and the storage device is located between the bottom plate and the top plate.

3. The electrical device according to claim 2, wherein the frame body further comprises a first holding portion located on the lateral plate, wherein the electrical device further comprises a main body having a bearing portion and a second holding portion located on the bearing portion, the frame body is located on the bearing portion and the first holding portion is securely engaged with the second holding portion.

4. The electrical device according to claim 3, wherein the second holding portion is sandwiched between the first holding portion and the lateral plate.

5. The electrical device according to claim 4, wherein the pin is tightly fitted with the opening of the storage device.

6. The electrical device according to claim 5, wherein the buffer member further comprises a reinforcing member, wherein the hardness of the reinforcing member is higher than that of the first buffer portion, the pin, the bending portion and the second buffer portion, and the reinforcing member is located inside the pin.

7. A buffer frame for a storage device, the buffer frame comprising:
   a frame body, comprising:
      a lateral plate having an accommodation space for accommodating the storage device, wherein the lateral plate has a perforation hole, an inner side surface and an outer side surface which is opposite to the inner side surface, wherein the inner side surface faces toward the accommodation space and the perforation hole is formed between the inner side surface and the outer side surface; and
      a bottom plate connected with the lateral plate, wherein the bottom plate extends away from the inner side surface of the lateral plate, the bottom plate has a top surface and a bottom surface which is opposite to the top surface, the top surface faces toward the accommodation space, and there is a non-straight angle between the top surface and the inner side surface; and
   a buffer member, comprising:
      a first buffer portion, wherein the hardness of the first buffer portion is lower than that of the frame body;
      a pin located on the first buffer portion;
      a bending portion connected with the first buffer portion; and
      a second buffer portion, wherein the hardness of the second buffer portion is lower than that of the frame body and the second buffer portion is connected with the bending portion, wherein the first buffer portion is connected with the second buffer portion via the bending portion, and the second buffer portion is attached to the bottom surface of the bottom plate, wherein the first buffer portion is attached to the outer side surface of the lateral plate and the pin passes through the perforation hole when the bending portion is bended,
   wherein the bottom surface of the bottom plate is opposite to the accommodation space.

8. The buffer frame according to claim 7, wherein the bottom plate of the frame body has an engaging hole and the buffer member has an engaging projection located on the second buffer portion, the engaging projection is engaged with the engaging hole.

9. The buffer frame according to claim 8, wherein the frame body has a connecting hole such that the perforation hole is connected with the engaging hole, the bending portion is located on the connecting hole.

10. The buffer frame according to claim 9, wherein the frame body further comprises a top plate which is connected with the lateral plate, and the accommodation space is formed between the bottom plate and the top plate.

11. The buffer frame according to claim 10, wherein the frame body further comprises a first holding portion located on the lateral plate.

* * * * *